US009623724B2

(12) United States Patent
Morishita et al.

(10) Patent No.: US 9,623,724 B2
(45) Date of Patent: Apr. 18, 2017

(54) VEHICLE, COOLING APPARATUS, AND COOLING METHOD

(75) Inventors: Hideaki Morishita, Tokyo (JP); Kentaro Kamei, Tokyo (JP); Kenji Furuse, Tokyo (JP); Masahiko Ikeo, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 832 days.

(21) Appl. No.: 13/618,155

(22) Filed: Sep. 14, 2012

(65) Prior Publication Data

US 2013/0084789 A1 Apr. 4, 2013

(30) Foreign Application Priority Data

Sep. 29, 2011 (JP) .................................. 2011-215661
Sep. 29, 2011 (JP) .................................. 2011-215662

(51) Int. Cl.
*B60H 1/00* (2006.01)
*B60H 3/00* (2006.01)
*B60H 1/32* (2006.01)

(52) U.S. Cl.
CPC ............. *B60H 1/32* (2013.01); *B60H 1/3204* (2013.01)

(58) Field of Classification Search
CPC ...... B60H 1/32; B60H 1/3204; B60H 1/3205; F16L 53/001
USPC .......................................... 60/418, 415, 413
See application file for complete search history.

(56) References Cited

U.S. PATENT DOCUMENTS

| 3,958,900 | A | | 5/1976 | Ueno | |
|---|---|---|---|---|---|
| 4,798,053 | A | | 1/1989 | Chang | |
| 4,989,499 | A | * | 2/1991 | Scoccia | B60H 1/247 454/70 |
| 5,528,900 | A | * | 6/1996 | Prasad | B60H 1/2215 62/175 |
| 5,955,940 | A | * | 9/1999 | Chen | B60R 25/04 123/179.2 |
| 7,886,552 | B2 | * | 2/2011 | Wang | B60H 1/00835 165/202 |
| 8,657,046 | B2 | | 2/2014 | Caudill | |
| 9,074,588 | B2 | | 7/2015 | Khajepour et al. | |
| 2004/0031634 | A1 | | 2/2004 | Ching | |
| 2007/0285218 | A1 | | 12/2007 | Fletcher et al. | |
| 2008/0296939 | A1 | | 12/2008 | Bajic et al. | |
| 2013/0084790 | A1 | | 4/2013 | Furuse et al. | |
| 2013/0104995 | A1 | | 5/2013 | Morishita et al. | |

(Continued)

FOREIGN PATENT DOCUMENTS

| JP | H03-123775 | 12/1991 |
|---|---|---|
| JP | 2004-122847 | 4/2004 |
| JP | 2005-238911 | 9/2005 |

(Continued)

*Primary Examiner* — Steven B McAllister
*Assistant Examiner* — Reginald McNeill, II
(74) *Attorney, Agent, or Firm* — Smith, Gambrell & Russell, LLP

(57) ABSTRACT

There are provided a vehicle, a cooling apparatus, and a cooling method. The vehicle includes passenger space that accommodates a user, a tank that is capable of storing compressed air, and a control unit to release the compressed air stored in the tank into the passenger space. The control unit controls releasing so as to release part or the whole volume of the compressed air stored in the tank into the passenger space.

19 Claims, 11 Drawing Sheets

(56) References Cited

U.S. PATENT DOCUMENTS

2015/0112493 A1* 4/2015 Haggerty .................. G01F 3/38
700/282

FOREIGN PATENT DOCUMENTS

| | | |
|---|---|---|
| JP | 2006-168476 | 6/2006 |
| JP | 2006168476 A | 6/2006 |
| JP | 2007-076546 | 3/2007 |
| JP | 2007-168466 | 7/2007 |
| JP | 2007-297965 | 11/2007 |
| JP | 2008-183996 | 8/2008 |
| JP | 2008-296901 | 12/2008 |
| JP | 2010-184579 | 8/2010 |
| JP | 2010-216739 | 9/2010 |
| KR | 20070059347 | 6/2007 |

* cited by examiner

VEHICLE, COOLING APPARATUS, AND COOLING METHOD

CROSS-REFERENCE TO RELATED APPLICATIONS

The present application claims priority from Japanese Patent Application Nos. 2011-215661 and 2011-215662, filed on Sep. 29, 2011, the entire contents of which are hereby incorporated by reference.

BACKGROUND OF THE INVENTION

1. Field of the Invention

The present invention relates to a vehicle, a cooling apparatus, and a cooling method, which cool passenger space of a vehicle such as an automobile or the like.

2. Description of the Related Art

A vehicle such as an automobile or the like commonly has an air conditioning apparatus which starts a cooling operation to the cool passenger space thereof, when a user gets in the vehicle and starts its engine by operating an ignition key.

With such an existing air conditioning apparatus, a cooling cycle is started when a user gets in the vehicle and operates the ignition key to start the engine. Accordingly, time delay occurs until the passenger space is actually cooled.

Therefore, in a situation where, for example, a vehicle is parked under the burning sun, its passenger space is heated, and thus a user has to endure the hot passenger space until the passenger space is cooled.

In order to solve such an existing problem, Japanese Unexamined Patent Application Publication (JP-A) Nos. 2006-168476, 2010-216739, 2008-296901, 2007-168466, 2008-183996, and 2005-238911 have disclosed techniques for releasing the compressed air into passenger space. In addition, JP-A No. 2007-297965 has disclosed a power generation and air cooling system taking advantage of pressure and heat of emission gas.

At the time of releasing such compressed air into passenger space, there are conditions to be considered regarding releasing volume of the compressed air.

SUMMARY OF THE INVENTION

The present invention has been made in the light of such a situation, and aims to provide a cooling apparatus that is capable of performing suitable releasing of the compressed air.

A first aspect of the present invention provides a vehicle including: passenger space that accommodates a user; a tank that is capable of storing compressed air; and a control unit to release the compressed air stored in the tank into the passenger space. The control unit controls releasing so as to release part of the compressed air stored in the tank into the passenger space.

Preferably, the control unit may store the compressed air in the tank so as to have fixed pressure, and control releasing so as to release part of the fixed pressure compressed air.

Preferably, the control unit may compute release volume according to temperature in the passenger space, and take smaller one of the computed release volume, and predetermined maximum release volume equivalent to part of the compressed air stored in the tank as release volume to be released from the tank.

A second aspect of the present invention provides a cooling apparatus to cool passenger space of a vehicle that accommodates a user, including: a tank that is capable of storing compressed air; and a control unit to release the compressed air stored in the tank into the passenger space. The control unit controls releasing so as to release part of the compressed air stored in the tank into the passenger space.

A third aspect of the present invention provides a cooling method for a cooling apparatus to store compressed air, for cooling passenger space of a vehicle accommodating a user, in a tank. The cooling method includes the steps of: storing the compressed air in the tank; and releasing part of the compressed air stored in the tank into the passenger space.

A fourth aspect of the present invention provides a vehicle including: passenger space that accommodates a user; a tank that is capable of storing compressed air; and a control unit to release the compressed air stored in the tank into the passenger space. When releasing the compressed air from the tank, the control unit releases the whole volume of the compressed air stored in the tank.

Preferably, the control unit may end releasing when the pressure in the tank becomes the same as the ambient atmospheric pressure.

Preferably, the control unit may have a detector to detect at least one of the pressure in the tank and the pressure in the passenger space, and end releasing in the event that pressure difference between the pressure in the tank and the pressure in the passenger space has reached equal to or smaller than a predetermined value.

Preferably, the control unit may end releasing in the event that a releasing period, based on a period until the pressure in the tank becomes the same as the ambient atmospheric pressure, elapses. Alternatively, the releasing period may be based on a period until there is no pressure difference between the pressure in the tank and the pressure in the passenger space.

Preferably, the vehicle may further include a reservoir tank to supply the compressed air to the tank.

A fifth aspect of the present invention provides a cooling apparatus to cool passenger space of a vehicle that accommodates a user, including: a tank that is capable of storing compressed air; and a control unit to release the compressed air stored in the tank into the passenger space. When releasing the compressed air from the tank, the control unit may release the whole volume of the compressed air stored in the tank.

A sixth aspect of the present invention provides a cooling method for a cooling apparatus to store compressed air, for cooling passenger space of a vehicle accommodating a user, in a tank. The cooling method includes the steps of: storing the compressed air in the tank; and releasing the whole volume of the compressed air stored in the tank into the passenger space.

With the present invention, the compressed air stored in a tank is released into passenger space. The passenger space is cooled by the compressed air released into the passenger space. As a result thereof, with the present invention, the vehicle interior can immediately be cooled.

DESCRIPTION OF THE PREFERRED EMBODIMENTS

First Embodiment

Figure 1:
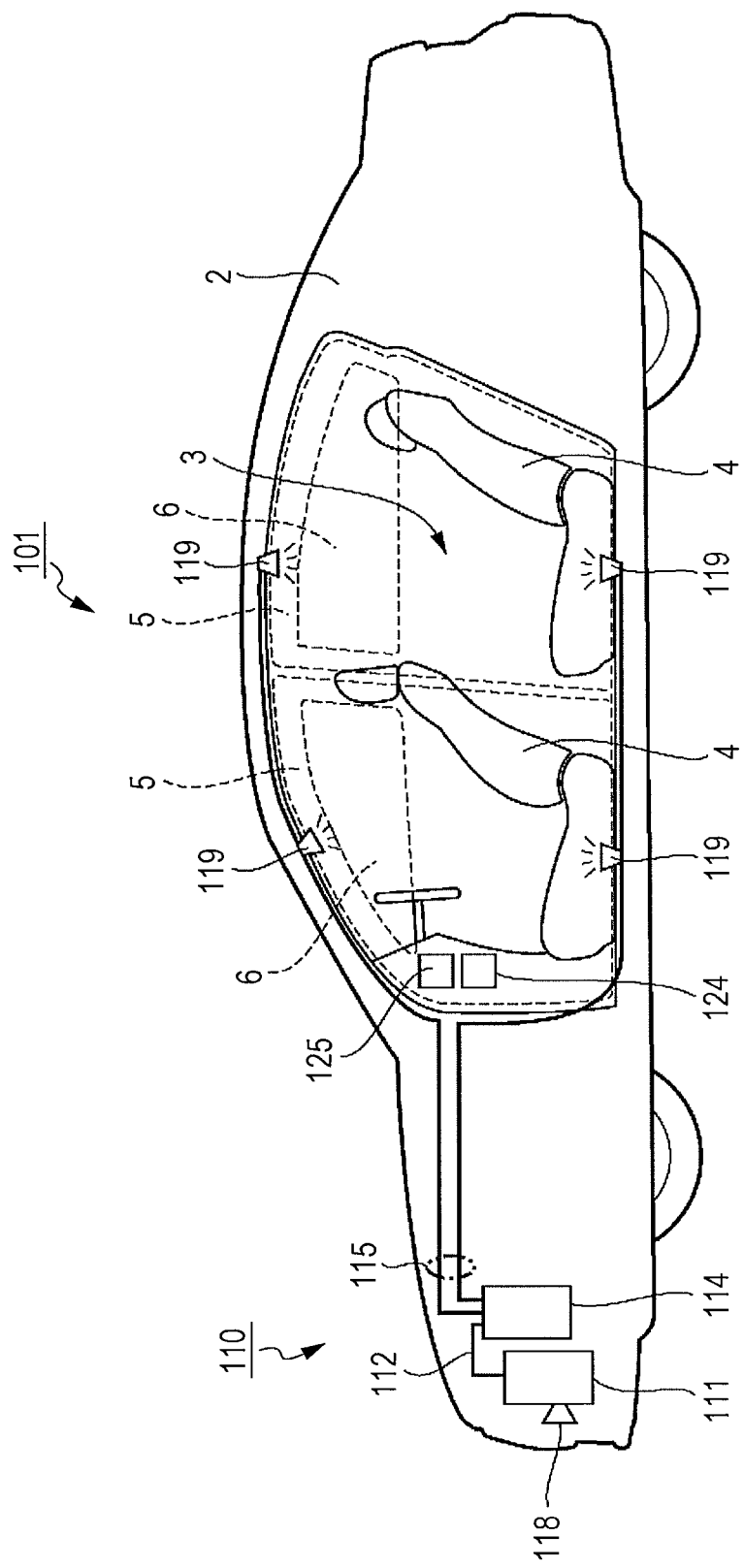
FIG. 1 is a partial transparent side view of the vehicle body of an automobile employing a cooling apparatus according to a first embodiment of the present invention.

FIG. 1 is a partial transparent side view of an automobile 101 employing a cooling apparatus 110 according to a first embodiment of the present invention. The automobile 101 in FIG. 1 includes a vehicle body 2. The central portion of the vehicle body 2 includes passenger space 3 that accommodates a user. Two rows of seats 4 where a user sits down are provided within the passenger space 3. A door panel 5 which the user opens/closes for boarding is provided to the side face of the passenger space 3 of the vehicle body 2. A window glass 6 is provided on the upper portion of the door panel 5 in a vertically movable manner. The user can sit in the seat 4 by opening/closing the door panel 5. The user can open/close the window glass 6 by operating an opening/closing switch provided in the inner side of the door panel 5.

The passenger space 3 becomes, in a state in which the door panel 5 and window glass 6 are closed, space isolated from the outside. With such passenger space 3, room temperature is significantly increased, for example, due to hot solar radiation in the summer or the like. Also, surface temperature of interior equipment such as the steering wheel and the seats 4 and so forth is also increased, and accordingly, as for the user, the passenger space 3 has to rapidly be cooled.

With a common automobile, the user who has got in the vehicle operates an ignition key to start the engine, to activate an air conditioning apparatus, and to drive a compressor along therewith, and accordingly, a cooling cycle of the air conditioning apparatus is activated, and accordingly, the air in the passenger space 3 is cooled.

However, in the event of cooling the passenger space 3 using the air conditioning apparatus in this way, the air in the passenger space 3 is immediately cooled using heat-exchange equipment, and accordingly, it takes time until the passenger space 3 is cooled after the user's boarding. Therefore, with the present embodiment, the cooling apparatus 110 is employed in which the passenger space is rapidly cooled by releasing the compressed air into the passenger space before a user who intends to get in the vehicle gets in the vehicle.

Figure 2:
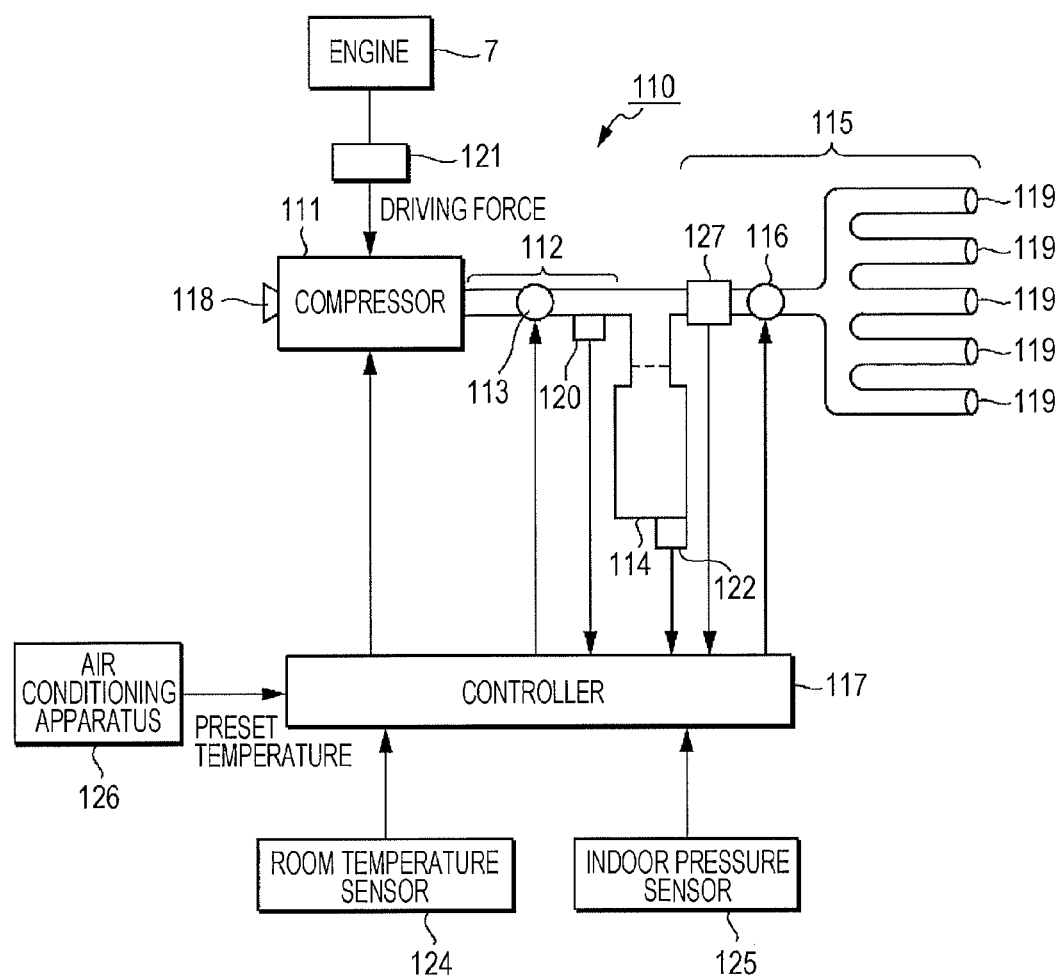
FIG. 2 is a configuration diagram of the cooling apparatus to be mounted on the automobile in FIG. 1.

FIG. 2 is a configuration diagram of the cooling apparatus 110 to be mounted on the automobile 101 in FIG. 1. With the cooling apparatus 110 in FIG. 2, the passenger space 3 is cooled by releasing the compressed air into the passenger space 3 in FIG. 1.

The cooling apparatus 110 includes a compressor 111, an air intake duct 112, an air intake valve 113, a tank 114, a discharge air duct 115, a discharge valve 116, and a controller 117. The cooling apparatus 110 has a tank pressure sensor 120 to detect pressure of the compressed air in the tank 114, a tank temperature sensor 122 to detect temperature of the compressed air in the tank 114, an in-room pressure sensor 125 to detect the pressure within the passenger space 3, and an indoor temperature sensor 124 to detect temperature of the passenger space 3.

With the compressor 111, activation and stop are controlled by the controller 117, and the air is absorbed, compressed, and output during activation. The controller 117 may control the capabilities of the compressor 111 being activated.

As for the compressor 111, a capacity-type pump may be employed, for example. The capacity-type pump compresses fluid by performing an operation in which fluid such as the air is absorbed from an intake vent 118, and the capacity of the absorbed fluid is reduced. Examples of the capacity-type pump include a gear pump, a diaphragm pump, a piston pump, and a plunger pump. The gear pump compresses fluid by rotation. The diaphragm pump, piston pump, and plunger pump compress fluid by reciprocation.

The cooling apparatus 110 according to the present embodiment directly releases the compressed air into the passenger space 3. In order to suppress contamination of the passenger space 3, it is desirable to employ an oil-less type as for the compressor 111. The compressed air in the cooling apparatus 110 may be supplied to the passenger space 3 by exchanging the cool air of the compressed air into another air such as the external air by heat-exchange equipment instead of being released into the passenger space 3 without change.

The intake vent 118 of the compressor 111 may be provided to the passenger space 3 or may be provided out of the automobile 101 (out of the passenger space 3). In the event of absorbing the external air out of the passenger space 3, the compressor 111 may adjust absorption capacity according to running speed, or may absorb the external air during parking. Fluctuation of the atmospheric pressure of the external air suppresses excessive load from affecting the compressor 111. In the event of absorbing the inner air within the passenger space 3, the atmospheric pressure of the passenger space 3 decreases. Therefore, for example, in a state in which the air conditioning apparatus 126 mounted on the automobile 101 is set to the external air introduction mode, the compressor 111 may absorb the inner air. The inner air is commonly adjusted with temperature and humidity by the air conditioning apparatus 126. The inner air suppresses, as compared to the external air, moisture in the air stored in the tank 114, cooling effects after re-releasing this air into the passenger space 3, and suppression effects of humidity increase can be expected.

The compressor 111 can take advantage of the rotation driving force of the engine 7 mounted on the vehicle body 2 as a source of power. Therefore, as illustrated in FIG. 1, it is desirable to provide the compressor 111 to the engine room. In this case, an electromagnetic clutch 121 is provided between the output shaft of the engine 7 and the input shaft of the compressor 111. The compressor 111 can be stopped while the engine 7 is operated by disengaging the electromagnetic clutch 121. In addition to this, for example, with the compressor 111, there may be employed, as a source of power, a power source such as a battery mounted in the vehicle body 2 or a solar panel, a household power source, or vibration of the vehicle body 2 such as vertical movement that occurs during driving.

Also, the compressor 111 of the cooling apparatus 110 may be integrated with a compressor of the air conditioning apparatus 126 mounted on the vehicle.

The air intake duct 112 connects the compressor 111 and tank 114. The air compressed by the compressor 111 is supplied to the tank 114 via the air intake duct 112.

The air intake valve 113 is provided to the air intake duct 112. Opening/closing of the air intake valve 113 is controlled by the controller 117. In the event that the air intake valve 113 is in an opened state, the air compressed by the compressor 111 is supplied to the tank 114. In the event that the air intake valve 113 is in a closed state, the air intake duct 112 is blocked, and supply of the compressed air from the compressor 111 to the tank 114 is stopped. The compressed air does not flow backward from the tank 114 side to the compressor 111.

With the tank 114, the compressed air is stored. The tank 114 may be a metal type, for example, such as stainless steel or the like, or may be a product made from reinforced plastic. With the tanks 114 made from these materials, the compressed air can be stored with high pressure. For example, with a vehicle of which the passenger space is 4000 liters in capacity, the compressed air is stored in a 40-liter tank at a pressure of 1470 psi, and a control unit releases the compressed air equivalent to equal to the capacity of the passenger space which is lower in temperature than room temperature, and accordingly, the air of higher room temperature within the passenger space is forced outside of the vehicle, and accordingly, the compressed air which has been cooled by being expanded replaces the air in the passenger space, whereby the room temperature of the passenger space can be decreased. Therefore, though there is no particular restriction regarding the capacity and shape of the tank 114, the capacity of the tank may suitably be equal to or greater than the capacity of the passenger space. Also, instead of the air in the passenger space being switched with the expanded compressed air, high room temperature in the passenger space may be decreased by releasing less compressed air than the capacity of the passenger space into the passenger space. The larger the capacity of the tank 114 is, the large the compressed air can be stored.

The tank 114 may be fixed to the automobile 101 or cooling apparatus 110, or may be detachable. In the case that the tank 114 is detachable, the tank 114 can be replaced. The tank 114 in which the compressed air is enclosed beforehand is attached, whereby the compressed air can be released into the passenger space 3 without using the compressor 111. Enclosing aroma oil, perfume, or the like, in the tank 114 along with the compressed air allows odor eliminating within the vehicle to be expected.

The installation place of the tank 114 is not particularly restricted. The tank 114 may be installed in a suitable place based on the safety standard or the like needed for the automobile 101 or the like. In FIG. 1, the tank 114 is provided in the engine room. The tank 114 may be installed in cargo space or the passenger space 3. In the event of installing the tank 114 in the passenger space 3, the tank 114 has to be installed in a place where direct sunlight does not hit or a place where the temperature is prevented from increasing.

Note that the cooling apparatus 110 may include multiple tanks 114. The multiple tanks 114 may be tanks which independently store the compressed air and independently supply to the passenger space 3, or may be tanks in which the compressed air is supplied from one of the tanks 114 to the other tank 114.

For example, an arrangement may be made such that a reservoir tank having a large capacity is added between the air intake valve 113 and tank 114 in FIG. 2, the compressed air is first stored in this reservoir tank, and the compressed air is supplied to the tank 114 after releasing from the reservoir tank.

At the time of supplying the compressed air from the reservoir tank to the tank 114 after releasing, supply of the compressed air from the reservoir tank may be controlled by the controller 117 so as to stabilize the pressure of the compressed air in the tank 114.

The discharge air duct 115 connects between the tank 114 and passenger space 3. The compressed air discharged from the tank 114 is supplied to the passenger space 3 of the automobile 101 through the discharge air duct 115.

A discharge vent 119 of the discharge air duct 115 is provided to the passenger space 3. The discharge vent 119 may have a nozzle shape. The discharge vent 119 has a nozzle shape, whereby the compressed air can be discharged to the passenger space 3 while maintaining pressure within the discharge air duct 115.

The locations, directions, and number of the discharge vents 119 do not have a particular restriction. The discharge vent of the air conditioning apparatus 126 may be used as the discharge vent 119. However, the compressed air has not only an advantage of decreasing the temperature by being expanded, but also an advantage of decreasing surface temperature of an object on which the compressed air is sprayed. Therefore, it is desirable to provide the discharge vent 119 in the position and direction where the compressed air can directly be sprayed on a location such as the seats, steering wheel, dashboard, and so forth where the temperature increases, or a location with which the user directly comes into contact. For example, the discharge vent 119 may be provided downward as to a pillar or roof or the like.

In FIG. 1, a part of the multiple discharge vents 119 are provided downward as to the roof, and are installed so as to spray the compressed air to the seats 4. Also, the rest of the multiple discharge vents 119 are provided upward within the seats 4, and are installed so as to spray the compressed air from the seats 4 to the passenger space 3.

A discharge valve 116 is provided to the discharge air duct 115. Opening/closing of the discharge valve 116 is controlled by the controller 117. In the event that the discharge valve 116 is in a closed state, the discharge air duct 115 is blocked, and the compressed air within the tank 114 is pooled and stored within the tank 114. The discharge valve 116 is closed under operation of the compressor 111, and accordingly, the air pressure within the tank 114 increases. In the event that the discharge valve 116 is in an opened state, the compressed air stored in the tank 114 is released into the passenger space 3.

Also, with the present embodiment, a flow rate sensor 127 is provided to the discharge air duct 115 between the tank 114 and the discharge valve 116. Examples of the flow rate sensor 127 include a venturi type, an orifice type, a heat ray type, a Kalman type, a turbine type, and impeller type. Taking vibration of the vehicle body 2 into consideration, an orfice type or heat ray type flow rate sensor is suitable. The flow rate sensor 127 outputs a signal indicating the detected flow volume to the controller 117.

The tank pressure sensor 120 is, as illustrated in FIG. 2 for example, provided between the air intake valve 113 and the discharge valve 116. In addition to this, the tank pressure sensor 120 may be provided to the tank 114. Thus, the tank pressure sensor 120 can detect the pressure of the tank 114.

An in-room pressure sensor 125 is, as illustrated in FIG. 1 for example, provided within a dashboard. The in-room pressure sensor 125 may be provided to a place other than this, in the passenger space 3. Thus, the in-room pressure sensor 125 can detect the pressure of the passenger space 3. The tank pressure sensor 120 and in-room pressure sensor 125 may be either one of a diaphragm type pressure sensor and a barrier membrane type pressure sensor. However, with the present embodiment, difference between the detection pressure of the tank pressure sensor 120 and the detection pressure of the in-room pressure sensor 125 is used, and accordingly, the same type has to be employed. Thus, the pressure sensors can be used for control even without strictly calibrating the sensitivity and so forth of each pressure sensor.

The tank temperature sensor 122 is, as illustrated in FIG. 2 for example, provided to the tank 114. The tank temperature sensor 122 may be provided between the air intake valve 113 and the discharge valve 116. Thus, the tank temperature sensor 122 can detect temperature of the compressed air stored in the tank 114.

The in-room temperature sensor 124 is, as illustrated in FIG. 1 for example, provided within the dashboard. The in-room pressure sensor 124 may be provided to a place other than this, in the passenger space 3. Thus, the in-room pressure sensor 124 can detect the temperature of the passenger space 3.

The controller 117 is connected to the units of the cooling apparatus 110, such as the compressor 111, air intake valve 113, discharge valve 116, tank pressure sensor 120, and so forth. The controller 117 controls the cooling apparatus 110.

The cooling apparatus 110 compresses the air at the compressor 111, stores the compressed air in the tank 114, and releases the compressed air stored in the tank 114 into the passenger space 3. The compressed air released into the passenger space 3 is expanded at the passenger space 3, and according to an endothermic effect at the time of this distension, the air within the passenger space 3 is cooled. Also, a location where the compressed air has been sprayed is cooled.

Note that, with the controller 117, the tank 114 in which the compressed air is stored may be heated by a heater, or may be cooled by a thermistor. Thus, the temperature before releasing of the compressed air is adjusted, and the room temperature of the passenger space 3 after the compressed air is released can be adjusted.

The controller 117 has memory in which a control program is stored, and a central processing unit which executes the control program. The controller 117 may be an independent controller 117, may be realized as a part of an ECU (Engine Control Unit) which controls the engine 7 of the automobile 101, or may be realized by a controller of the air conditioning apparatus 126.

In order to obtain various types of information to be used for control processing or determination, a driving control signal of the vehicle, and various types of detection signals are input to the controller 117. Examples of such signals include a detection signal of the tank pressure sensor 120, in-room pressure sensor 125, external temperature sensor, inner temperature sensor, and sunlight sensor. In addition to these, there are a detection signal of the state of the ignition key, an activation signal/stop signal of the engine 7, a speed pulse signal, a brake operation signal, a remote control open/close key detection signal, and an unlocking signal/locking signal of the door panel 5. Also, a signal indicating preset temperature or the like is input from the air conditioning apparatus 126 provided to the vehicle body 2.

Note that the controller 117 may have a timer to measure point-in-time and time, a wireless communication unit which communicates with a cellular phone or the like, and so forth.

Figure 3:
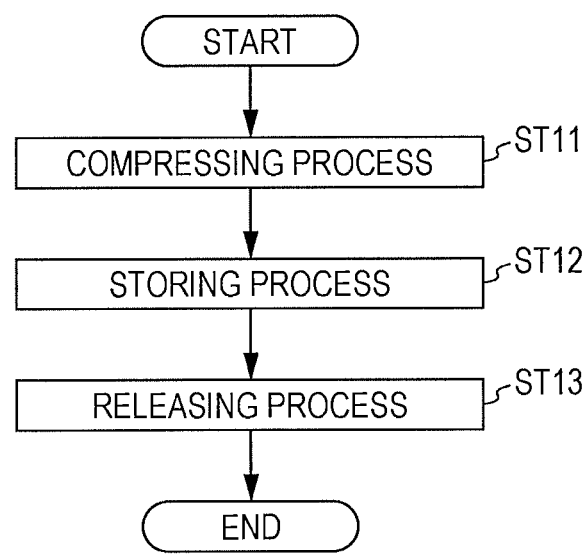
FIG. 3 is a flowchart of control for cooling using the controller in FIG. 2.

Next, operation of the cooling apparatus 110 in FIG. 2 will be described. FIG. 3 is a flowchart illustrating the entirety of a cooling process of the cooling apparatus 110 in FIG. 2. With the overall control in FIG. 3, the controller 117 of the cooling apparatus 110 first executes an air compressing process (step ST11).

The controller 117 executes the compressing process after the user gets in the vehicle and starts the engine 7, for example.

With the compressing process, in a state in which the air intake valve 113 is opened, and the discharge valve 116 is closed, the controller 117 operates the compressor 111 to supply the compressed air to the tank 114. In the event of employing the electromagnetic clutch 121, the controller 117 connects this.

The controller 117 may determine, based on a detection signal of the tank pressure sensor 120 which detects the pressure of the tank 114, and a flag indicating the cycle of the cooling apparatus 110 stored in memory, whether or not there is the compressed air in the tank 114, and in the event that no compressed air is stored, may operate the compressor 111.

In the event that the pressure of the tank pressure sensor 120 has reached equal to or greater than a predetermined reference value, the controller 117 stops the compressor 111, and closes the air intake valve 113. In the event of employing the electromagnetic clutch 121, the controller 117 blocks this.

Thus, the air intake valve 113 and discharge valve 116 both are in a closed state, and the compressed air having pressure equal to or greater than a reference value is stored in the tank 114 (storing process, step ST2).

Note that predetermined reference pressure for stopping storage of the compressed air as to the tank 114 has to be higher than the atmospheric pressure, and is several Mpa, for example. With the present embodiment, regarding the compressed air stored with high pressure in the tank 114 in this way, only a portion thereof is released at the releasing process.

Incidentally, the air generates heat when compressed. The compressed air stored in the tank 114 is cooled along with the tank 114 after completion of compression. For example, in the event that the tank 114 does not have a heat-insulated configuration, temperature of the compressed air is cooled up to the same temperature as the external temperature of the tank 114. Accordingly, with the storing process after the compressed air is supplied to this tank 114, the temperature of the compressed air within the tank 114 is cooled to normal temperature, for example.

Next, the controller 117 executes a releasing process (step ST13).

The controller 117 starts the releasing process, for example, when the user gets in the vehicle, after the user gets in the vehicle, or in the event that determination is made that the user is likely to get in the vehicle. In this case, each time the user gets in the vehicle, the controller 117 executes the releasing process at the time of boarding, and then executes the compressing process.

With the releasing process, the controller 117 opens the discharge valve 116 while keeping the air intake valve 113 closed. Thus, the compressed air stored in the tank 114 is discharged to the passenger space 3 through a discharge nozzle.

The controller 117 monitors the flow volume detected by the flow rate sensor 127, and controls releasing so as to release part of the compressed air stored and cooled in the tank 114 into the passenger space 3.

The compressed air released into the passenger space 3 is expanded within the passenger space 3, and the room temperature in the passenger space 3 is decreased by endothermic reaction accompanied with expansion. The higher the pressure of the compressed air to be released is, cooling effects due to expansion of this compressed air can be expected.

Note that it is sufficient for part of the compressed air stored and cooled in the tank 114 mentioned here to be part of release volume in the event that the whole volume is released from the tank 114. Even in the event of releasing the whole volume from the tank 114, the normal pressure air remains in the tank 114, and accordingly, it is sufficient for part of the compressed air to be a value smaller than a value obtained by subtracting the capacity of the tank 114 from the amount of the compressed air stored in the tank 114.

However, the present embodiment aims to release the compressed air with generally constant high pressure into the passenger space 3, and accordingly, preferably, release volume is suppressed until the pressure of the tank 114 becomes 70% at the time of releasing start, and further preferably, is suppressed until the pressure of the tank 114 becomes 80%.

Also, with this releasing process, in order to suppress pressure increase in the passenger space 3, the controller 117 may execute control to open the window glass 6 together, or may control the air conditioning apparatus 126 in accordance with the external air introduction mode. The controller 117 may start releasing of the compressed air in a state in which a vent hole is provided to the passenger space 3 in this way. The controller 117 may detect that the one of the window glass 6 and door panel 5 has been opened to start releasing of the compressed air.

As described above, in order to release the compressed air into the passenger space 3, the controller 117 executes the compressing process, storing process, and releasing process as one-time cooling cycle. Thus, the room temperature of the passenger space 3 after releasing decreases as compared to before releasing. The cooling apparatus 110 can cool the passenger space 3. The controller 117 repeatedly executes the cooling cycle, whereby the passenger space 3 can be cooled over multiple times.

Also, with the cooling apparatus 110 according to the present embodiment, instead of releasing into the passenger space 3 immediately after compressing the air, the compressed air passes through the storing process. According to passing through a cooling period in this storing process, the temperature in the compressed air decreases as compared to the temperature at the time of completion of compression, and reaches normal temperature, for example.

The compressed air of which the temperature has been lowered is released into the passenger space 3, whereby more room temperature lowering can be expected as compared to a case where the high-temperature compressed air immediately after compression is released.

Also, with the releasing process, the controller 117 performs control so as to release part of the compressed air stored in the tank 114 into the passenger space 3. In particular, with the present embodiment, the controller 117 controls releasing so as to release part of the compressed air with generally constant pressure after storing the compressed air with generally constant pressure in the tank 114. Thus, the compressed air can be released into the passenger space 3 under this generally constant pressure.

Only compressed air with a predetermined high constant pressure is released into the passenger space 3, whereby the passenger space 3 can effectively be cooled while suppressing increase in the pressure of the passenger space 3 with discharge of a small amount of compressed air, as compared with a case of discharging the entire volume of the tank 114 for example. The user can open the door panel 5 immediately after releasing, for example.

On the other hand, in the event of releasing the whole volume of the tank 114, the compressed air released from the tank 114 at the final stage has pressure similar to generally the atmospheric pressure. Even in the event of releasing the air with a low compression degree into the passenger space 3 in this way, it is difficult to expect higher cooling effects due to expansion of the compressed air with a low compression degree thereof.

Second Embodiment

The first embodiment is an example of the basic configuration and operation of the cooling apparatus 110 which cools the passenger space 3 using the compressed air. A second embodiment is an example in which the releasing process of the cooling apparatus 110 according to the first embodiment has been improved. The configurations of the vehicle and cooling apparatus 110 according to the second embodiment are the same configurations as those in the first embodiment.

Figure 4:
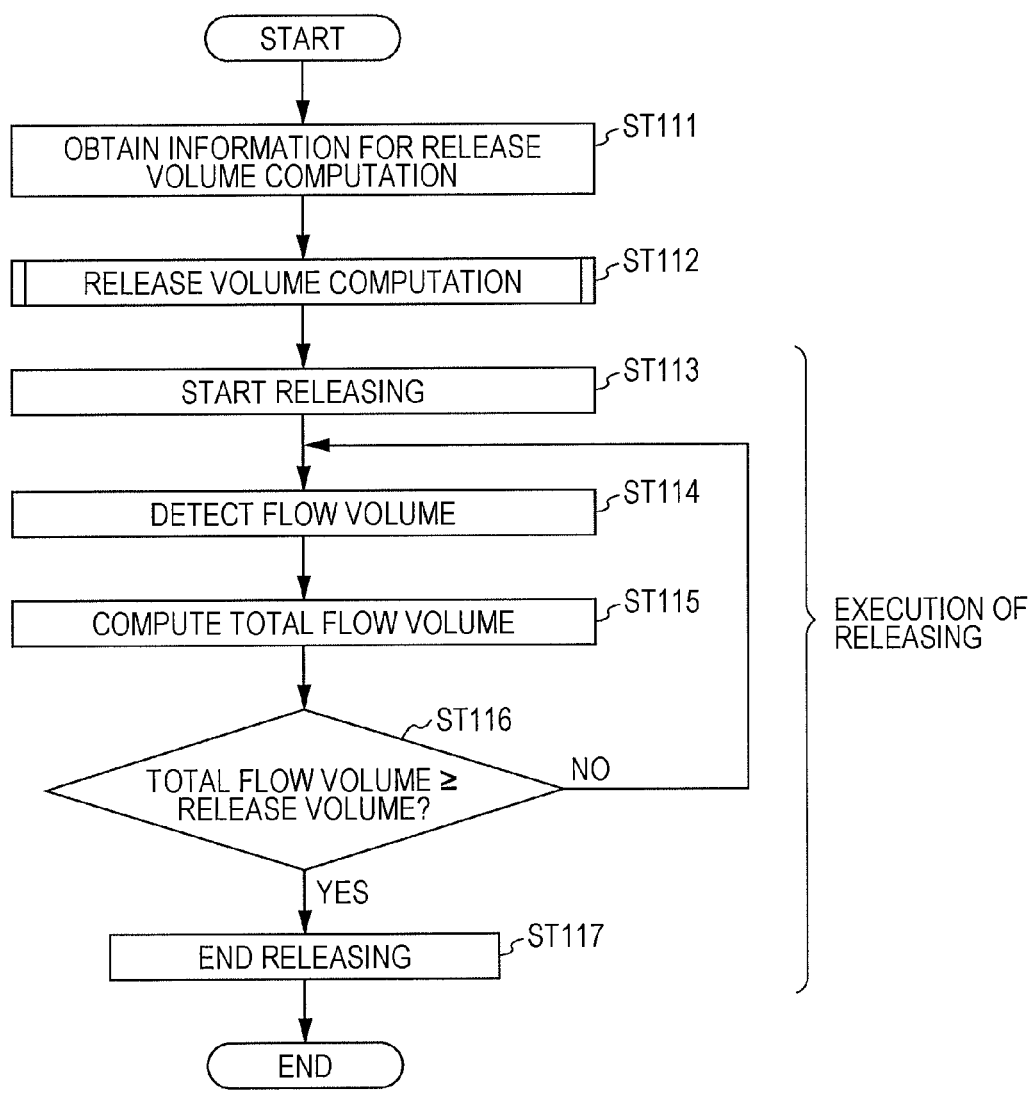
FIG. 4 is a flowchart of a releasing process of a cooling apparatus according to a second embodiment of the present invention.

FIG. 4 is a flowchart of the releasing process of the cooling apparatus 110 according to the second embodiment of the present invention. The execution timing of the releasing process may be immediately before the user gets in the vehicle, for example. As illustrated in FIG. 4, with the releasing process of the compressed air, the controller 117 first obtains information for computing release volume, and so forth (step ST111).

Examples of such information include at least one of the pressure and temperature of the passenger space 3, at least one of the pressure and temperature of the compressed air in the tank 114, and the preset temperature of the air conditioning apparatus 126. After obtaining the information, the controller 117 computes release volume (step ST112). The controller 117 computes release volume not exceeding part of the compressed air stored and cooled in the tank 114.

Figure 5:
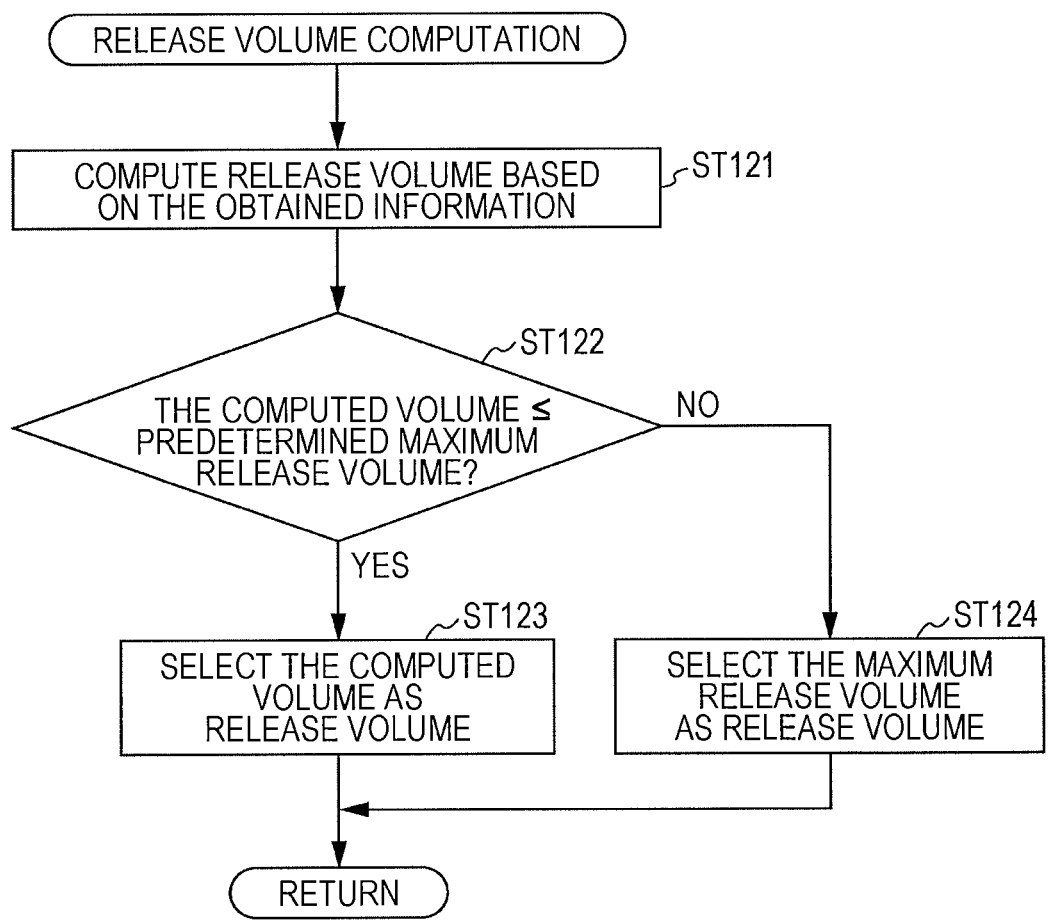
FIG. 5 is a flowchart illustrating a detailed example of the release volume computation step in FIG. 4.

FIG. 5 is a flowchart illustrating a detailed example of the release volume computing step in FIG. 4. As illustrated in FIG. 5, with computation of release volume, the controller 117 first desired release volume based on the obtained information (step ST121).

The controller 117 computes release volume necessary for taking the room temperature of the passenger space 3 as temperature set to the air conditioning apparatus 126.

Next, the controller 117 compares the computed release volume with predetermined maximum release volume (step ST122).

In the event that the computed release volume is less than the maximum release volume, the controller 117 selects the computed release volume as release volume to be actually released (step ST123).

In the event that the computed release volume is equal to or greater than the maximum release volume, the controller 117 selects the maximum release volume as release volume to be actually released (step ST124).

Note that the maximum release volume may be the release volume of part of the compressed air in the tank 114.

In particular, the release volume may have a maximum release volume such that the pressure of the compressed air to be released from the tank 114 is higher than the pressure of the passenger space 3 and maintained in the pressure within a predetermined certain range whereby high cooling effects due to expansion of the compressed air can be expected.

Returning to FIG. 4, upon release volume being computed in step ST112, the controller 117 starts releasing (step ST113). The controller 117 opens the discharge valve 116 while closing the air intake valve 113.

After starting releasing of the compressed air, the controller 117 monitors flow volume to obtain releasing end timing. Specifically, the controller 117 detects flow volume of the compressed air released from the tank 114 using the flow rate sensor 127 (step ST114).

Thereafter, the controller 117 integrates the flow volume measured from starting releasing of the compressed air to compute total flow volume of the compressed air released from the tank 114 (step ST115).

Next, the controller 117 compares the computed total flow volume with the computed release volume (step ST116). In the event that the total flow volume is less than the release volume, this indicates that a predetermined part of the compressed air has not been released from the tank 114.

The controller 117 continues releasing. Also, the controller 117 continues monitoring of flow volume (steps ST114 through ST116). In the event that the total flow volume is equal to or greater than the release volume, this indicates that predetermined compressed air has been released from the tank 114.

The controller 117 ends releasing (step ST117). The controller 117 closes the discharge valve 116. As described above, the controller 117 computes release volume not exceeding part of the compressed air in the tank 114 based on the room temperature of the passenger space 3 and so forth, and releases the compressed air stored and cooled in the tank 114 within the release volume thereof. Accordingly, with the present embodiment, the room temperature of the passenger space 3 can be prevented from being needlessly lowered by excessive releasing of the compressed air.

Third Embodiment

Figure 6:
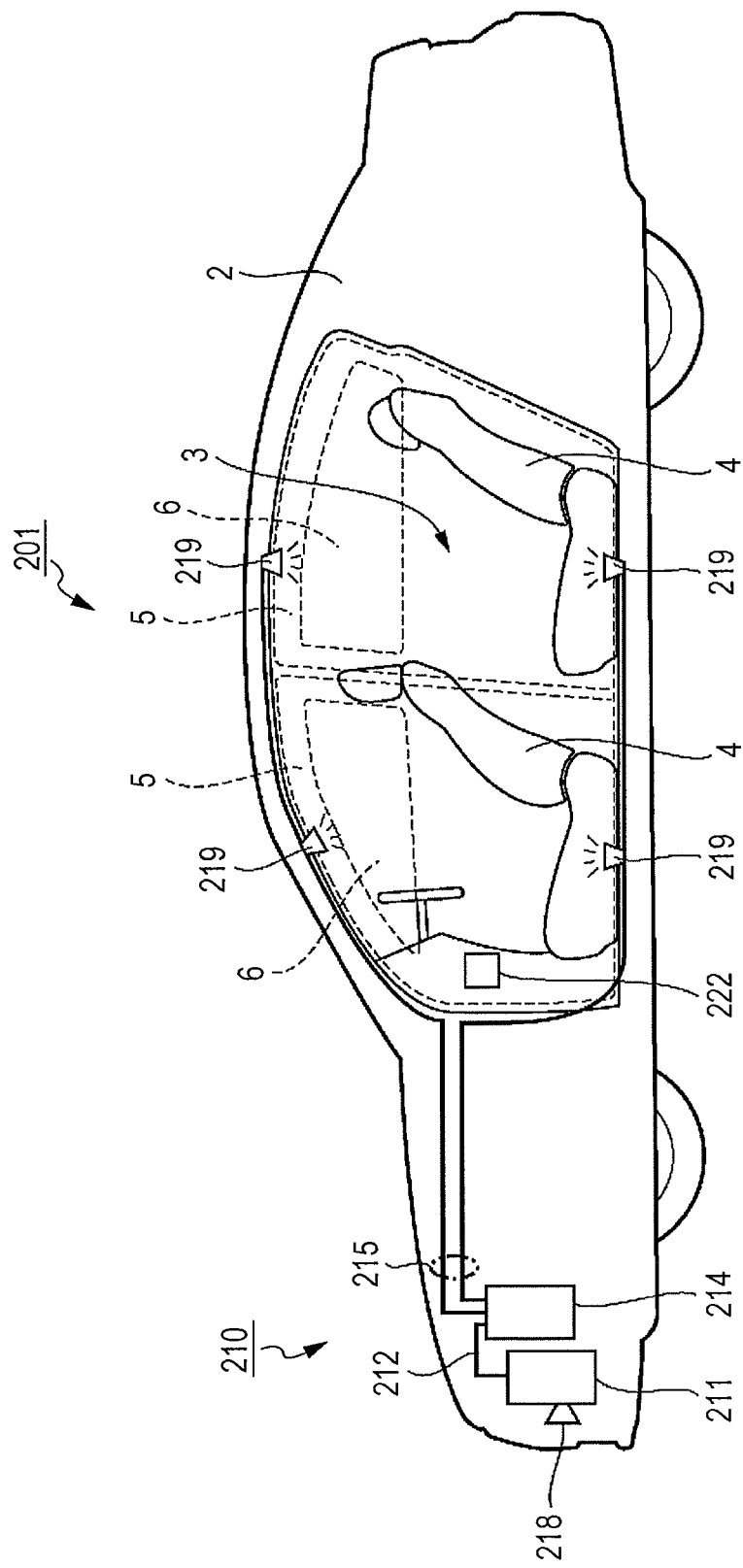
FIG. 6 is a partial transparent side view of the vehicle body of an automobile employing a cooling apparatus according to a third embodiment of the present invention.

FIG. 6 is a partial transparent side view of an automobile 201 employing a cooling apparatus 210 according to a third embodiment of the present invention. Note that description will be omitted regarding the same contents as with the first and second embodiments.

Figure 7:
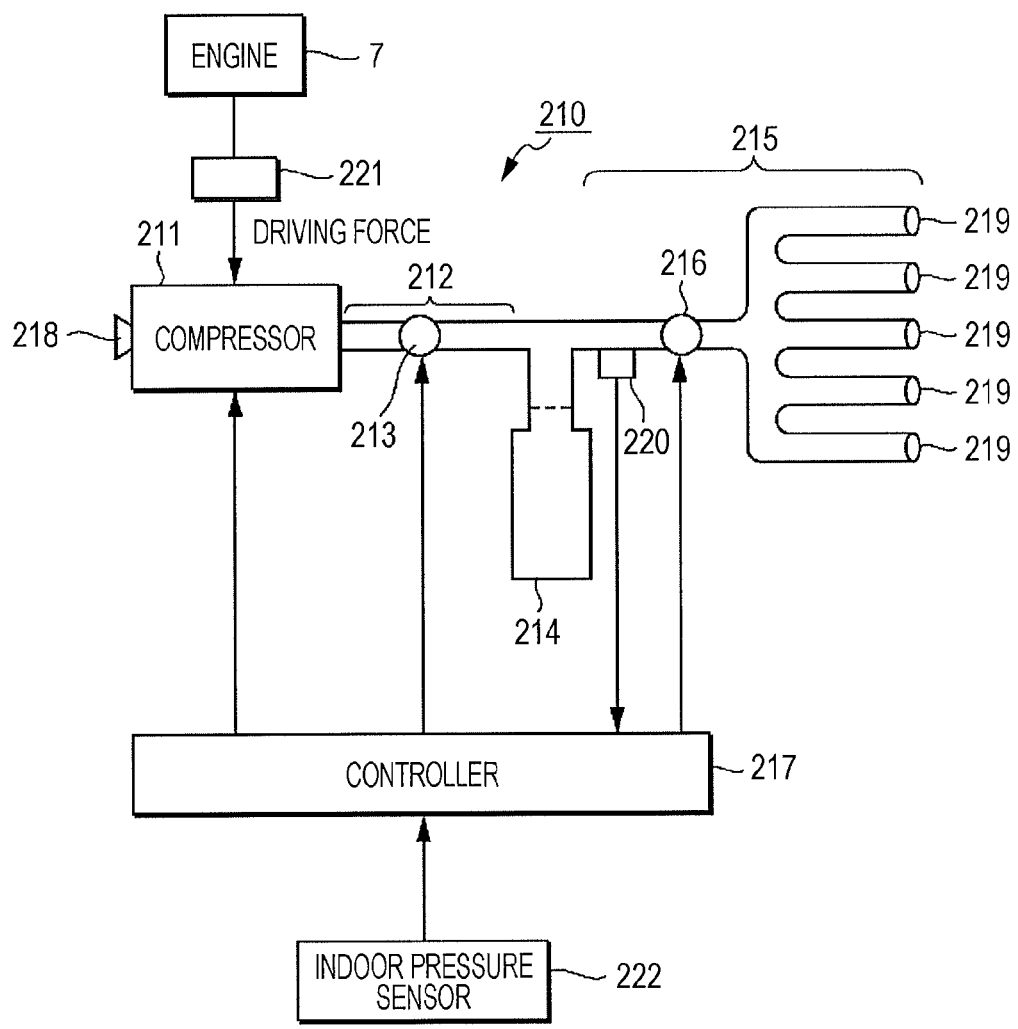
FIG. 7 is a configuration diagram of the cooling apparatus to be mounted on the automobile in FIG. 6.

FIG. 7 is a configuration diagram of the cooling apparatus 210 to be mounted on the automobile 201 in FIG. 6. The cooling apparatus 210 in FIG. 7 cools the passenger space 3 by releasing the compressed air into the passenger space 3 in FIG. 7.

The cooling apparatus 210 includes a compressor 211, an air intake duct 212, an air intake valve 213, a tank 214, a discharge air duct 215, a discharge valve 216, and a controller 217. The cooling apparatus 210 includes a tank pressure sensor 220 which detects the pressure of the compressed air of the tank 214, and an in-room pressure sensor 222 which detects the pressure of the passenger space.

Figure 8:
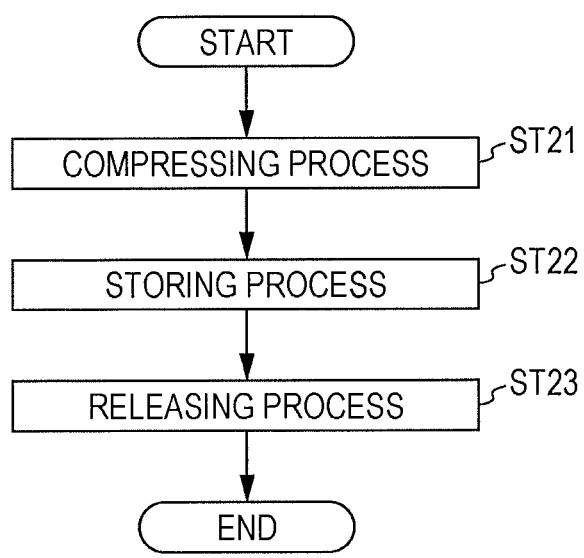
FIG. 8 is a flowchart of control for cooling using the controller in FIG. 7.

Next, operation of the cooling apparatus 210 in FIG. 6 will be described. FIG. 8 is a flowchart illustrating the entirety of a cooling process of the cooling apparatus 210 in FIG. 6. With overall control in FIG. 8, the controller 217 of the cooling apparatus 210 first executes an air compressing process (step ST21).

The controller 217 executes, after the user gets in the vehicle and starts the engine 7 for example, the compressing process. In the event that the pressure of the tank pressure sensor 220 has reached equal to or greater than a reference value, the controller 217 stops the compressor 211, and closes the air intake valve 213. In the event of employing the electromagnetic clutch 221, the controller 217 blocks this. Thus, the air intake valve 213 and discharge valve 216 both are in a closed state, and the compressed air having certain pressure equal to or greater than a reference value is stored in the tank 214 (storing process, step ST22).

Next, the controller 217 executes the releasing process (step ST23). The controller 217 starts the releasing process, for example, when the user gets in the vehicle, after the user's boarding, or in a situation in which the user is likely to get in the vehicle. In this case, the controller 217 executes the releasing process at the time of boarding each time the user gets in the vehicle, and then executes the compressing process.

With the releasing process, the controller 217 opens the discharge valve 216 while closing the air intake valve 213. Thus, the compressed air stored in the tank 214 is discharged to the passenger space 3 through the discharge nozzle. The entire volume of the compressed air is released into the passenger space 3 from the tank 214. The compressed air is expanded within the passenger space 3, and the room temperature of the passenger space 3 is lowered by endothermic reaction accompanying expansion.

As described above, the controller 217 executes the compressing process, storing process, and releasing process as one-time cooling cycle to release the compressed air into the passenger space 3. Also, with each releasing process, the controller 217 releases the entire volume of the compressed air stored in the tank 214 into the passenger space 3. Accordingly, the capacity of the tank 214 can be reduced in the minimum capacity necessary for this releasing. The installation space for the tank 214 is reduced, and flexibility of an installation place for the tank 214 is high.

Also, with regard to control of releasing, the controller 217 just releases the compressed air from the tank 214. Thus, the control of the controller 217 is convenient. Complicated control is not needed. Also, with the compressing process, upon the pressure in the tank 214 reaching predetermined pressure, the controller 217 ends the compressing process. Thus, the pressure of the compressed air to be released into the passenger space 3 is generally constant pressure.

The pressure of the compressed air is constant, whereby a fixed effect can be expected as a cooling effect according to the compressed air. Also, fluctuation in the pressure of the passenger space 3 after releasing the compressed air can be suppressed in a fixed range. Occurrence of inconvenience due to increase in pressure can be suppressed.

Fourth Embodiment

The third embodiment is an example of the basic configuration and operation of the cooling apparatus 210 which cools the passenger space 3 using the compressed air. A fourth embodiment is an example of the releasing process of the cooling apparatus 210 according to the third embodiment having been improved. The configurations of the vehicle and cooling apparatus 210 in the fourth embodiment are the same as those in the third embodiment.

Figure 9:
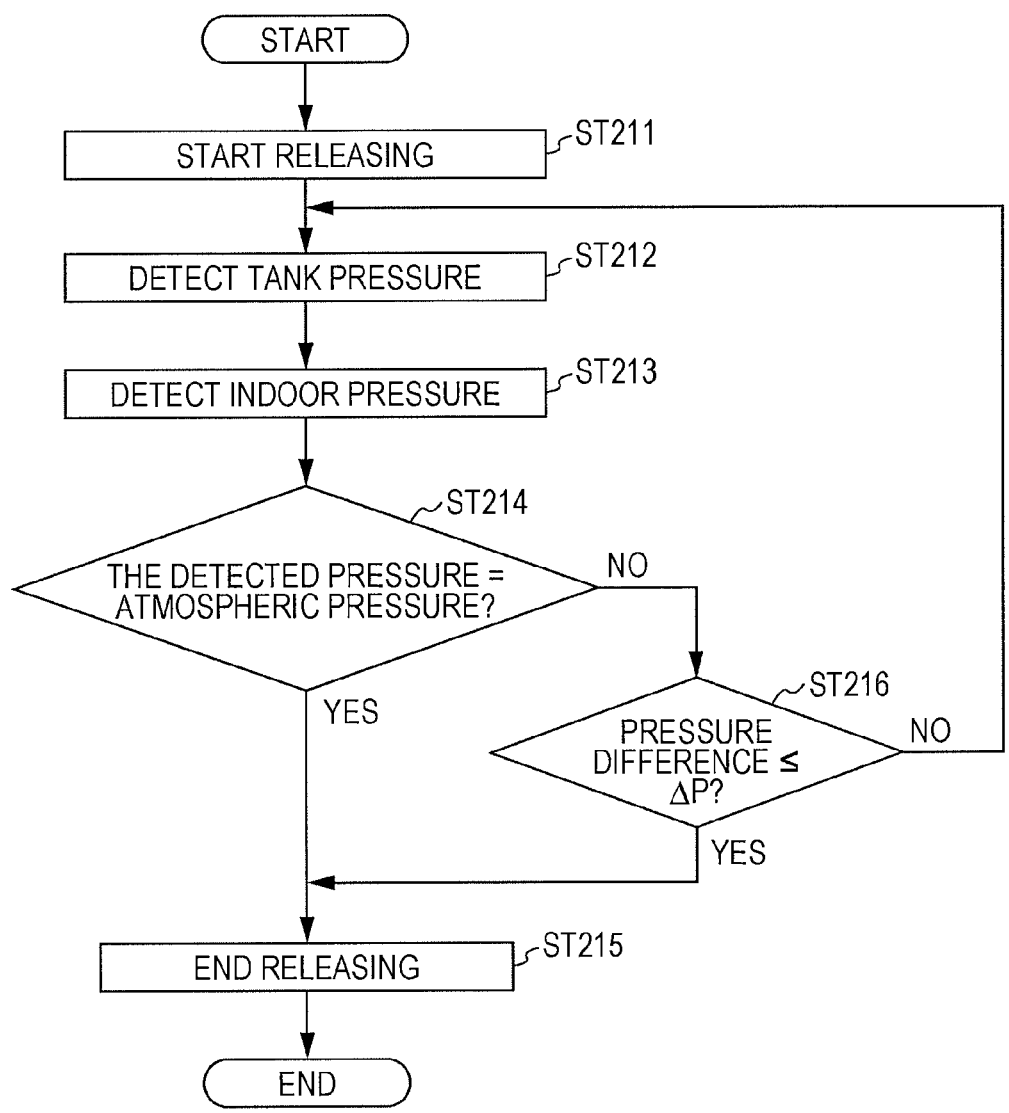
FIG. 9 is a flowchart of a releasing process of a cooling apparatus according to a fourth embodiment of the present invention.

FIG. 9 is a flowchart of the releasing process of the cooling apparatus 210 according to the fourth embodiment of the present invention. As illustrated in FIG. 9, with the releasing process of the compressed air, the controller 217 starts releasing (step ST211).

Releasing timing may be when the user gets in the vehicle, for example. With the releasing process, the controller 217 opens the discharge valve 216 while closing the air intake valve 213. After starting releasing of the compressed air, the controller 217 starts monitoring of pressure to obtain releasing end timing. Specifically, the controller 217 obtains the pressure in the thank 214 from a detection signal of the tank pressure sensor 220 (step ST212).

The controller 217 obtains the pressure in the passenger space 3 from a detection signal from the in-door pressure sensor 222 (step ST213).

Thereafter, the controller 217 determines whether or not the pressure in the tank 214 has reached the atmospheric pressure (step ST214). In the event that the pressure in the tank 214 has been lowered to the atmospheric pressure, this indicates that all of the compressed air in the tank 214 has been released.

The controller 217 ends releasing (step ST215). The controller 217 closes the discharge valve 216.

In the event that the pressure in the tank 214 has not been lowered to the atmospheric pressure, the controller 217 further computes pressure difference between the pressure in the tank 214 and the pressure in the passenger space 3, and determines whether or not this pressure difference is included in a predetermined error range (step ST216).

For example, in the event that all of the door panel 5 and window glass 6 in the passenger space 3 are closed, the compressed air released into the passenger space 3 gradually leaks from the passenger space 3. This is also applied to a case where the air conditioning apparatus is in an internal air circulation mode.

In this case, even in the event that releasing of the compressed air from the tank 214 has substantially been completed, the pressure in the passenger space 3, and the pressure of the tank 214 do not immediately decrease to the atmospheric pressure. In such a case, in order to prevent determination of releasing completion of the compressed air from being delayed, with the present embodiment, confirmation is made in step ST216 that there is no pressure difference between the tank 214 and the passenger space 3.

In the event that pressure difference between the tank 214 and the passenger space 3 is equal to or smaller than a predetermined value, the controller 217 ends releasing (step ST215).

Also, in the event that pressure difference between the tank 214 and the passenger space 3 exceeds a predetermined value and remains, the controller 217 continues to monitor the pressure. The controller 217 repeatedly executes steps ST212, ST213, ST214, and ST216. In the event that Yes is determined in step ST214 or ST216, the controller 217 ends the releasing process.

As described above, the controller 217 monitors pressure in the releasing process, and in the event that the pressure in the tank 214 has reached the atmospheric pressure, and in the event that pressure difference between the pressure in the tank 214, and the pressure in the passenger space 3 has become equal to or lower than a predetermined value, ends releasing. Accordingly, with the releasing process, all of the volume of the compressed air stored in the tank 214 can be released.

Also, time necessary and also sufficient for enabling all of the volume of the compressed air stored in the tank 214 to be released is secured as the period of the releasing process, and accordingly, the compressing process can be started thereafter. For example, the releasing process is carried out at the time of the user's boarding, and the compressing process can be started from start-up timing of the engine 7 immediately thereafter. The compressing process is started early, so the compressing process is more likely to be completed in a shorter time and also even in the case that a boarding period is short.

Fifth Embodiment

A fifth embodiment is another example of the releasing process of the cooling apparatus 210 according to the third embodiment having been improved. The configurations of the vehicle and cooling apparatus 210 in the fifth embodiment are the same as those in the third embodiment.

Figure 10:
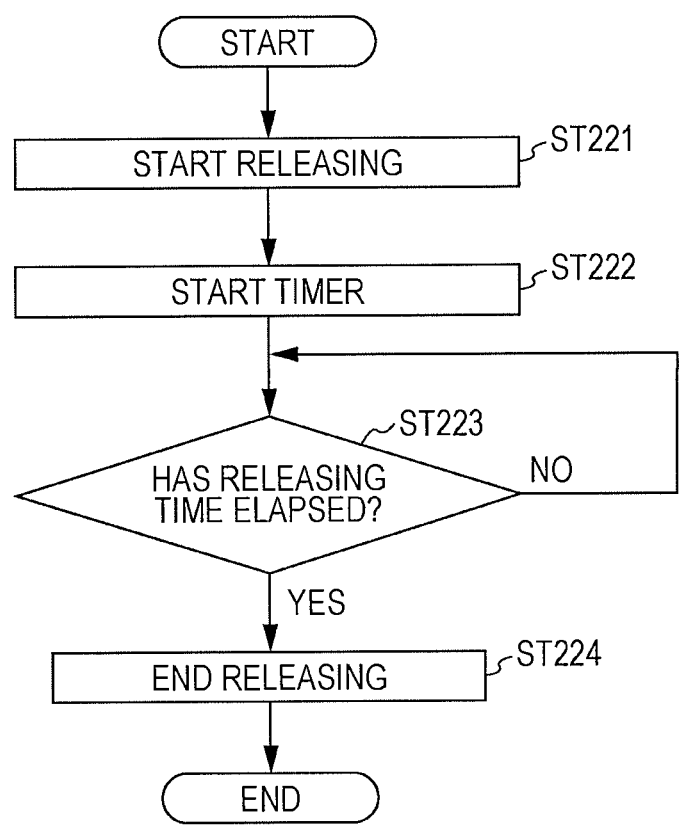
FIG. 10 is a flowchart of a releasing process of a cooling apparatus according to a fifth embodiment of the present invention.

FIG. 10 is a flowchart of the releasing process of the cooling apparatus 210 according to the fifth embodiment of the present invention. As illustrated in FIG. 10, with the releasing process of the compressed air, the controller 217 starts releasing (step ST221).

Releasing timing may be when the user gets in the vehicle, for example. With the releasing process, the controller 217 opens the discharge valve 216 while closing the air intake valve 213. After starting releasing of the compressed air, the controller 217 measures release completion time using a timer within the controller 217 to obtain releasing end timing. Specifically, the controller 217 starts the timer (step ST222).

Thereafter, the controller 217 determines whether or not the time measured by the timer has passed a predetermined releasing period (step ST223).

The releasing period may be a period from start of releasing of the compressed air from the tank 214 until the pressure in the tank 214 reaches the atmospheric pressure. Also, the releasing period may be a period from start of releasing of the compressed air from the tank 214 until the pressure in the tank 214 agrees with the pressure in the passenger space 3 in a state in which the door panel 5 and window glass 6 of the passenger space 3 are closed. Also, of these periods, any longer period may be taken as the releasing period.

Upon the time measured by the timer reaching a predetermined period, the controller 217 ends releasing (step ST224). The controller 217 closes the discharge valve 216.

As described above, the controller 217 measures the releasing period using the timer in the releasing process, and in the event that the releasing period thereof has elapsed, ends releasing. Accordingly, with the releasing process, all of the volume of the compressed air stored in the tank 214 can be released.

Also, the controller 217 determines releasing end timing based on the time measured by the timer, and accordingly, the tank pressure sensor 220 and indoor pressure sensor 222 according to the second embodiment are not needed.

Sixth Embodiment

Figure 11:
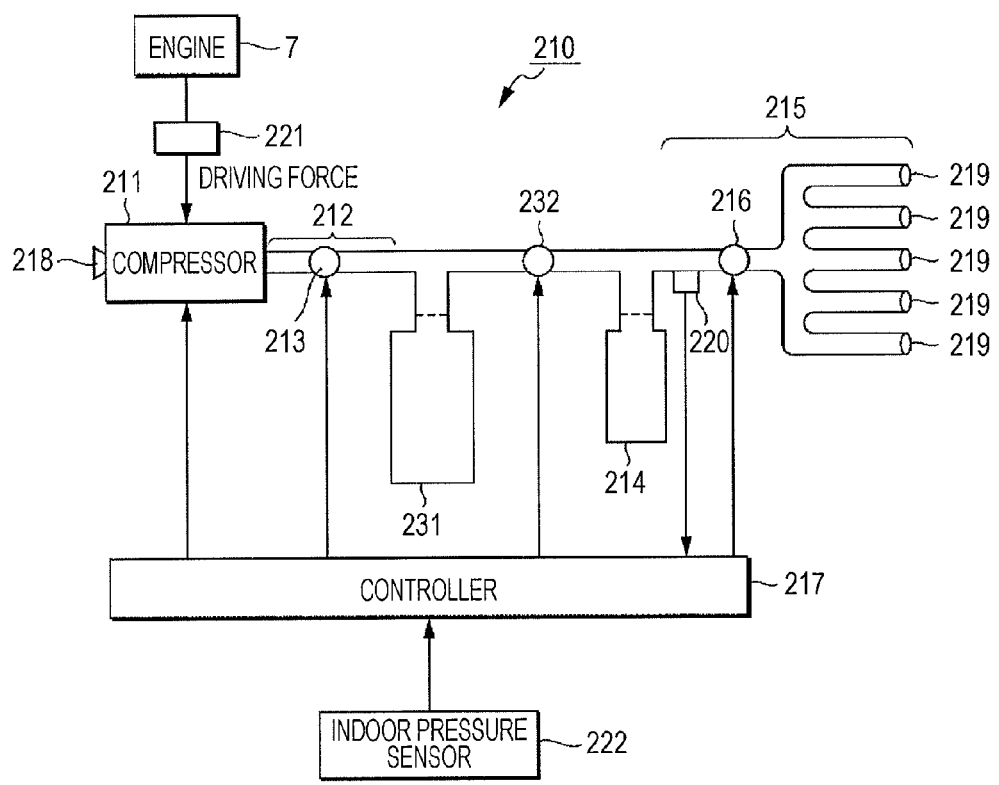
FIG. 11 is a configuration diagram of a cooling apparatus according to a sixth embodiment of the present invention.

FIG. 11 is a configuration diagram of a cooling apparatus 210 according to a sixth embodiment of the present invention. The configuration of the cooling apparatus 210 in FIG. 11 is the same as the configuration of the cooling apparatus 210 according to the third embodiment except for adding a reservoir tank 231 and an isolation valve 232.

The reservoir tank 231 stores the compressed air together with the tank 214. It is sufficient for the reservoir tank 231 to have the same material and configuration as with the tank 214. The reservoir tank 231 is preferably formed greater than the tank 214 so as to have greater capacity than the tank 214.

It is sufficient for the reservoir tank 231 to be connected to the air intake duct 212 and discharge air duct 215 in parallel. In FIG. 11, the reservoir tank 231 is connected between the air intake duct 212 and tank 214. It is sufficient for the reservoir tank 231 to be disposed in the engine room of the vehicle body 2 in FIG. 6, or the like. The isolation valve 232 is connected between the reservoir tank 231 and tank 214. With the isolation valve 232, opening/closing is controlled by the controller 217.

In the event that the isolation valve 232 is in an opened state, the reservoir tank 231 and tank 214 are isolated. In the event that the isolation valve 232 is in a closed state, the reservoir tank 231 and tank 214 are communicated.

The basic operation of the cooling apparatus 210 in the sixth embodiment is the same as with in the third embodiment. Hereafter, operation different from the third embodiment will be described.

With the compressing process, the controller 217 opens the isolation valve 232 along with the air intake valve 213. With the compressing process, the compressed air is stored in the reservoir tank 231 and tank 214.

With the storing process, the controller 217 may open or close the isolation valve 232. With the storing process, the compressed air stored in the reservoir tank 231 is cooled in the same way as with the compressed air stored in the tank 214.

With the releasing process, the controller 217 opens the discharge valve 216 in a state in which the isolation valve 232 is closed. Upon ending releasing, the controller 217 closes the discharge valve 216 in a state in which the isolation valve 232 is closed. Accordingly, with the releasing process, the compressed air stored in the tank 214 is released. The compressed air stored in the reservoir tank 231 is not released.

As described above, with the present embodiment, the tank 214 is employed for releasing. Accordingly, even after releasing the compressed air from the tank 214, the compressed air is stored in the reservoir tank 231.

In the event that the compressed air is stored in the reservoir tank 231 in this way, the controller 217 may open the isolation valve 232 without activating the compressor 211 in the compressing process for the next releasing. The compressed air in the reservoir tank 231 can be moved to and filled in the tank 214 by opening the isolation valve 232 while closing the air intake valve 213.

Even in the event that the user repeats boarding in short time so as not to generate the compressed air with sufficient pressure using the compressor 211, the cooling apparatus 210 can release the compressed air from the tank 214 multiple number of times with multiple number of times of boarding thereof.

Note that, with the present embodiment, at the compressing process employing the compressor 211, the compressed air is simultaneously stored in the reservoir tank 231 and tank 214.

In addition to this, for example, with the compressing process employing the compressor 211, after storing the compressed air in the reservoir tank 231, the compressed air may be filled in the tank 214 from the reservoir tank 231.

The above embodiments are preferable embodiments of the present invention, but the present invention is not restricted to these, and various modifications or changes can be made without departing from the essence of the present invention.

With the above embodiments, the cooling apparatuses 110 and 210 are mounted on the automobiles 101 and 210, respectively. In addition to these, for example, the cooling apparatuses 110 and 210 may be mounted on another vehicle such as a bus, train, or the like.

The cooling apparatuses 110 and 210 may be formed as independent apparatuses separately from the vehicle.

Electric motors are employed as driving sources of the compressors 111 and 211, whereby the cooling apparatuses 110 and 210 can carry out the compressing process without taking the driving source of the engine 7 as a driving source. The cooling apparatuses 110 and 210 employing the electric compressor can be operated by any one of the power of a battery of the vehicle, a solar power-generating panel, and a household power source.

The cooling apparatuses 110 and 210 are configured so as to be portable, whereby these can be used for cooling of multiple vehicles, and can be used as cooling apparatuses 110 and 210 for emergency use.

With the above embodiments, the cooling apparatuses 110 and 210 include the compressors 111 and 211 in addition to the tanks 114 and 214. In addition to these, for example, an arrangement may be made where the cooling apparatuses 110 and 210 do not include the compressors 111 and 211, by the tanks 114 and 214 being configured so as to be replaceable. In this case, the cooling apparatuses 110 and 210 do not carry out the compressing process. Also, the cooling apparatuses 110 and 210 carry out the cooling process by confirming residual pressure of the tanks 114 and 214, or confirming whether or not new tanks 114 and 214 have been mounted. In the event of purchasing and using the tanks 114 and 214, the tanks 114 and 214 thereof have usually cooled to normal temperature, and accordingly, the storing process for cooling is not needed.

With the above embodiments, the passenger space 3 of a vehicle such as the automobile 101 or 201 is cooled by the cooling apparatus 110 or 210. A vehicle such as the automobile 101 or 201 includes an air conditioning apparatus which cools the passenger space 3 by circulating a cooling medium using a compressor, a condenser, a receiver, an expansion valve, and an evaporator, and spraying the air in the passenger space 3 on the evaporator using a blower fan.

In addition to this, for example, the passenger space 3 of a vehicle such as the automobile 101 or 201 may be cooled by the cooling apparatus 110 or 210, and the air conditioning apparatus. For example, after the passenger space 3 is initially cooled at the cooling apparatus 110 or 210, the passenger space 3 may be cooled to a predetermined temperature by the air conditioning apparatus. Thus, the passenger space 3 is cooled in short time in a sure manner as compared to a case where the passenger space 3 is cooled by the air conditioning apparatus alone.

Note that such cooperative cooling operation between the cooling apparatus 110 or 210 and the air conditioning apparatus can be realized, in the case that these have a separate controller, by transmitting an activation signal from the cooling apparatus 110 or 210 to the air conditioning apparatus.

With an arrangement where the controller is shared, such cooperative cooling operation between the cooling apparatus 110 or 210 and the air conditioning apparatus can be realized by program-to-program communication according to a flag or the like from the control program in the cooling apparatus 110 or 210 to the control program in the air conditioning apparatus.

What is claimed is:

1. A vehicle comprising:
a passenger space to accommodate a user;
a tank to store compressed air; and
a control unit to control release of the compressed air stored in the tank into the passenger space, wherein
the control unit computes a release volume according to a temperature in the passenger space, and takes the smaller of the computed release volume and a predetermined maximum release volume as a release volume to be released from the tank, and
the control unit determines that a vent opening to the passenger space, for releasing air from the passenger space to an environment outside the passenger space, is in an open state as a condition for starting release of the compressed air.

2. The vehicle according to claim 1, wherein the control unit stores the compressed air in the tank so as to have fixed pressure.

3. The vehicle according to claim 1, wherein the predetermined maximum release volume is equivalent to a part or the whole volume of the compressed air stored in the tank.

4. The vehicle according to claim 1, wherein the control unit ends releasing when the pressure in the tank becomes the same as the ambient atmospheric pressure.

5. The vehicle according to claim 1, wherein the control unit has a detector to detect at least one of the pressure in the tank and the pressure in the passenger space, and ends releasing in the event that a pressure difference between the pressure in the tank and the pressure in the passenger space has reached equal to or smaller than a predetermined value.

6. The vehicle according to claim 4, wherein the control unit has a detector to detect at least one of the pressure in the tank and the pressure in the passenger space, and ends releasing in the event that pressure difference between the pressure in the tank and the pressure in the passenger space has reached equal to or smaller than a predetermined value.

7. The vehicle according to claim 1, wherein the control unit ends releasing in the event that a releasing period based on a period until the pressure in the tank becomes the same as the ambient atmospheric pressure, or a releasing period based on a period until there is no pressure difference between the pressure in the tank and the pressure in the passenger space, has elapsed.

8. The vehicle according to claim 1, further comprising:
a reservoir tank to supply compressed air to the tank.

9. The vehicle according to claim 4, further comprising:
a reservoir tank to supply compressed air to the tank.

10. The vehicle according to claim 5, further comprising:
a reservoir tank to supply compressed air to the tank.

11. The vehicle according to claim 7, further comprising:
a reservoir tank to supply compressed air to the tank.

12. A cooling apparatus to cool a passenger space of a vehicle that accommodates a user, comprising:
a tank to store compressed air; and
a control unit to control release of the compressed air stored in the tank for delivery to the passenger space, wherein
the control unit receives a signal indicating that a vent opening to the passenger space, for releasing air from the passenger space to an environment outside the passenger space, is in an open state as a condition for starting release of the compressed air.

13. The cooling apparatus according to claim 12, wherein the control unit controls releasing so as to release less than all of the compressed air stored in the tank.

14. The cooling apparatus according to claim 12, wherein the control unit controls releasing so as to release the whole volume of the compressed air stored in the tank.

15. The cooling apparatus according to claim 12, wherein the control unit outputs a signal to create a vent opening by opening a window to the passenger space.

16. The cooling apparatus according to claim 12, wherein the control unit outputs a signal to create a vent opening by controlling an air conditioning apparatus.

17. The cooling apparatus according to claim 12, wherein the control unit receives a signal indicating that a user is about to get into the vehicle as a condition for starting release of the compressed air.

18. The vehicle according to claim 1, further comprising:
a compressor to receive an intake air, compress the received intake air, and output the compressed air for storage in the tank,
wherein the compressor comprises an intake vent that is open to the passenger space for receiving an inner air from the passenger space as the intake air.

19. The vehicle according to claim 1, further comprising:
a flow rate sensor to measure a flow volume of compressed air released from the tank,
wherein the control unit determines an end timing for the release of compressed air from the tank based on the flow volume measured by the flow rate sensor.

* * * * *